United States Patent [19]

Morita et al.

[11] 4,351,991
[45] Sep. 28, 1982

[54] DIRECTION INDICATOR BLINKER LIGHT SWITCHING ARRANGEMENT

[75] Inventors: Masayuki Morita, Tokoname; Tasuku Nakano, Mizunami, both of Japan

[73] Assignee: Kabushiki Kaisha Tokai Rika Denki Seisakusho, Aichi, Japan

[21] Appl. No.: 207,070

[22] Filed: Nov. 14, 1980

[30] Foreign Application Priority Data

Nov. 22, 1979 [JP] Japan .................................. 54-151714
Dec. 12, 1979 [JP] Japan ........................... 54-172008[U]

[51] Int. Cl.³ .............................................. H01H 3/16
[52] U.S. Cl. .............................. 200/61.27; 200/61.3; 200/61.34; 200/61.35
[58] Field of Search ................. 200/61.27, 61.3–61.38, 200/61.54

[56] References Cited

U.S. PATENT DOCUMENTS 1,749,429  3/1930  Horton .......................... 200/61.27 X
4,123,632  10/1978  Muto ................................. 200/61.27

FOREIGN PATENT DOCUMENTS

508252  6/1939  United Kingdom ............. 200/61.34

Primary Examiner—J. R. Scott
Attorney, Agent, or Firm—Wenderoth, Lind & Ponack

[57] ABSTRACT

A direction indicator blinker light switching arrangement for a motor vehicle of the type provided with an automatic cancelling mechanism, including a pivotal actuator mounted to the vehicle at a location separated from the cancelling mechanism. The switches are mounted to a bracket pivotally mounted about the steering shaft of the vehicle. The bracket is separately coupled to a cancelling cam through a ratchet disposed on the bracket and to the actuator through an elongated interconnection structure such as a cable, a pair of wires, a pivotal rod or a crank.

19 Claims, 10 Drawing Figures

DIRECTION INDICATOR BLINKER LIGHT SWITCHING ARRANGEMENT

BACKGROUND OF THE INVENTION

This invention relates to a direction indicator blinker light switching arrangement for use in motor vehicles, and more particularly, to such arrangement of the type provided with an automatically cancelling mechanism.

Recent steering wheels for use in motor vehicles are adapted to comprise one or two spokes of the type arranged to bridge the steering wheel and a steering shaft, thereby enabling a driver to readily observe an instrument panel or dashboard without an obstruction in visibility by such spokes. A handling lever for actuating a direction indicator blinker light switch is, however, still provided in or around a steering shaft in a conventional manner. Further, the construction of the switching unit, which includes therein a position retaining mechanism for the handling lever, switching means each adapted to be actuated by the handling lever, a mechanism for automatically cancelling the actuation of the handling lever in association with the pivotal movement of the steering wheel etc., remains unchanged and is still adapted to be provided on the steering shaft. Such being the case, in spite of the intention to decrease the number of the spokes for purposes as stated above, not only the bulky housing, but also the rather untidily arranged handling lever, which are both otherwise hidden from the driver by the spokes, come in sight. Accordingly, the ornamental features surrounding the dashboard are particularly affected by the existence of the handling lever and the configuration and size of the housing. However, according to such arrangement as described above, since the retaining mechanism and its cancelling mechanism must be integrally provided as one unit, setting the size and/or configuration of the housing as desired or alterations of the mounting positions of the handling lever are not readily effected. Thus, in order to enhance the ornamental features around the dashboard, such conventional construction of the switching unit with the handling lever must be improved.

SUMMARY OF THE INVENTION

Accordingly, an essential object of the present invention is to provide a direction indicator blinker light switching arrangement of the type provided with an automatically cancelling mechanism, which is adapted to have such construction that an actuator of the arrangement and its automatically cancelling mechanism are separately assembled.

Another important object of the present invention is to provide a direction indicator blinker light switching arrangement of the above described type, which is simple in construction and highly efficient in use.

A further object of the present invention is to provide a direction indicator blinker light switching arrangement of the above described type, which can be manufactured on a large scale at low cost.

In accomplishing these and other objects according to one preferred embodiment of the present invention, there is provided a direction indicator blinker light switching arrangement of the type provided with an automatically cancelling mechanism as will be described hereinbelow. The arrangement comprises an actuator disposed within a driver's operable distance inside a motor vehicle and adapted to be selectively displaceable from a non-actuating position to a rightward actuating position and its directionally opposite, leftward actuating position to effect relatively directionally opposite actuating drives; a mechanism for cancelling a positioning of the rightward position or the leftward position of the actuator, which includes a cam surrounding a steering shaft in a manner such that it can be rotated in association with rotational steering movement of the steering shaft, and a ratchet adapted to be pivotally displaced to a switching position for a right direction indicator blinker light and its directionally opposite switching position for a left direction indicator blinker light with respect to a neutral position, with the ratchet being engageable with the cam in both switching positions, in which the ratchet having been displaced in a selected one of the switching positions is to be returned to the neutral position, when the cam is rotated in a direction opposite relative to the above described selected switching position; and a lever for interconnecting the actuator and the cancelling mechanism and transmitting the actuating drives to the ratchet in response to respective displacement of the actuator, thereby to make the ratchet be selectively displaced in the two switching positions stated above. As is clear from the above description, the actuator and its cancelling mechanism, both constituting the arrangement of the present invention, can be separately provided. Accordingly, due to such advantage of the invention, a switching unit including the cancelling mechanism can be constructed in a compact size, with the ornamental features surrounding a dashboard and the steering shaft being much improved.

BRIEF DESCRIPTION OF THE DRAWINGS

These and other objects and features of the present invention will become apparent from the following description taken in conjunction with the preferred embodiment thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Referring now to FIGS. 1 to 5, there is shown a direction indicator blinker light switching arrangement in accordance with one preferred embodiment of the invention, in which the arrangement is of a type provided with an automatically cancelling mechanism.

Figure 1:
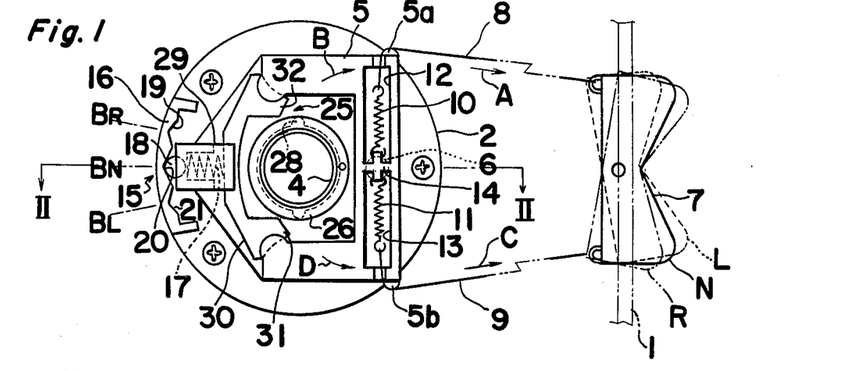
FIG. 1 is a top plan view of a direction indicator blinker light switching arrangement of the invention shown to be assembled to vehicular components which have been removed for clarity.
Figure 2:
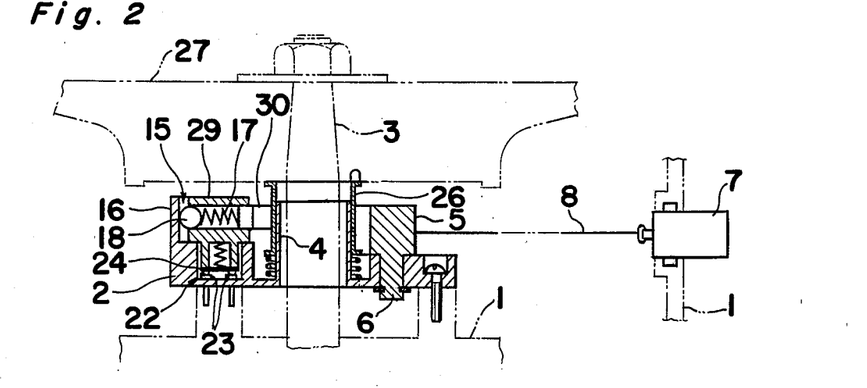
FIG. 2 is a cross sectional view of the arrangement of FIG. 1, taken generally on the plane of line II—II of FIG. 2.
Figure 3:
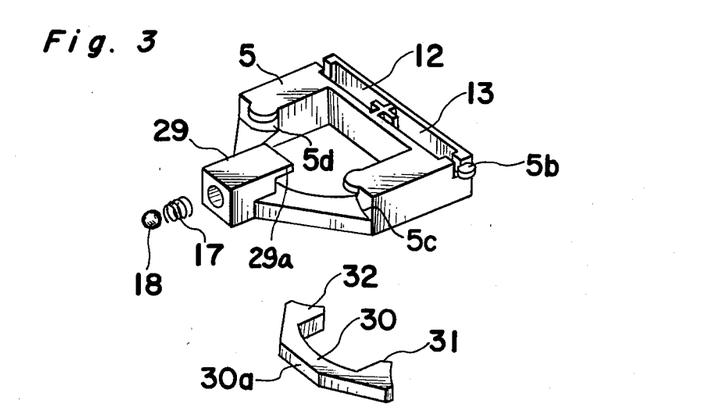
FIG. 3 is a perspective, exploded view showing the disassembled relationship of the components included in a bracket for use in the arrangement shown in FIG. 1.
Figure 4:
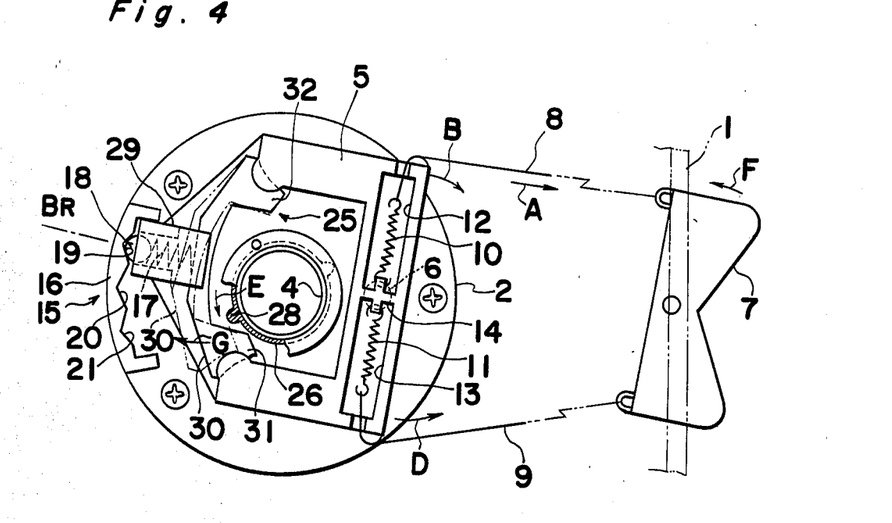
FIG. 4 is a view similar to FIG. 1, particularly showing the arrangement shown in FIG. 1 and rendering its right direction indicating mode.
Figure 5:
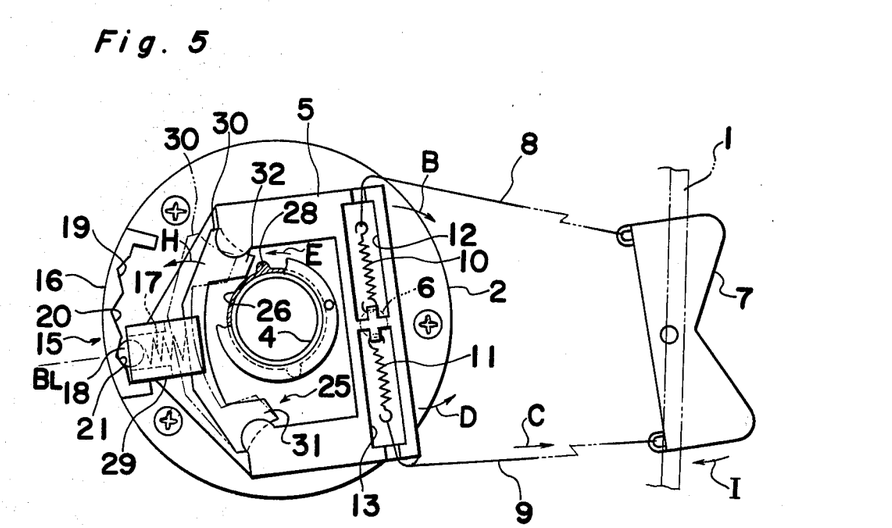
FIG. 5 is a view similar to FIG. 1, particularly showing the arrangement shown in FIG. 1 and rendering its left direction indicating mode.

The switching arrangement of the present invention mainly comprises an assembling board 2 secured to a framework 1 mounted on a steering column shaft (not shown here), an approximately pentagonally shaped bracket 5 positioned on the assembling board 2 (see FIGS. 1 and 3), a direction indicator blinker light switch 22, a cancelling mechanism 25, and an actuator 7. The assembling board 2 is centrally opened thereby to provide a cylindrical portion 4, through which a steering shaft 3 is adapted to be extended. The bracket 5 surrounding the cylindrical portion 4 is pivotally movable by means of a pivot pin 6, which is projected from a bottom surface of a trough-like block portion constituting the bracket 5. Separated from the location of the assembling board 2, the actuator 7 of the rocker or see-saw type is mounted to the framework 1. The actuator 7 is adapted to be pivotally moved from a neutral position (N) as denoted in a real line in FIG. 1 towards rightwardly or leftwardly, thereby to take a rightward actuating position (R) or a leftward actuating position (L), both of which are denoted in respective imaginary lines in FIG. 1. Between the bracket 5 and the actuator 7, there are provided a pair of steel wires 8 and 9 each having a spring portion, so that the bracket 5 and actuator 7 are capable of being resiliently connected and can cooperate with each other as will be described hereinafter. Respective ends of these steel wires 8 and 9 are each connected to corresponding ring members as provided on a rear surface of the actuator 7, while these two ring members are mutually oppositely disposed with respect to a pivotal center of the actuator 7. On the other hand, each of the other ends of these steel wires 8 and 9 is connected to one end of the corresponding coil spring whose other end is further connected to a corresponding engaging portion provided in the trough-like block portion of the bracket 5. More specifically, each of these coil springs 10 and 11 is accommodated in each of longitudinally recessed portion 12 and 13 both made in the trough-like block portion of the bracket 5. However, as best shown in FIG. 2, these two longitudinally recessed portions are separated from the other by a transversely provided wall 14, on both sides of which a pair of engaging portions for respective coil springs 11 and 12 are provided. The respective ends of the wires 8 and 9 are connected to corresponding ends of the respective coil spring 11 and 12, while their stretching portions are adapted to run on respective cornering portions 5a and 5b provided for the bracket 5, thereby to cause their stretching directions to be changed by approximate right angles, and then, to be further stretched to be connected with the respective ring members on the actuator 7. By such arrangement, in accordance with the pivotal movement of the actuator 7 from the neutral position (N) to the first position (R), the wire 8 is pulled in a direction as denoted by an arrow A in FIG. 1, with the bracket 5 being pivotally moved with respect to the pivot center 6 in a direction as denoted by an arrow B. On the other hand, in accordance with the pivotal movement of the actuator 7 from the neutral position (N) to the second position (L), the wire 9 is pulled in a direction as denoted by an arrow C, with the bracket 5 being pivotally moved with respect to the pivotal center 6 in a direction as denoted by an arrow D. Further, circumferential portion of the assembling board 2 is formed in configuration to have a specific wall, so that a retaining (dent) mechanism 15, with which such bracket 5 angularly shifted as described above can be retained in these positions, may be constituted in conjunction with specific provisions of the bracket 5. The dent mechanism 15 comprises a retaining wall 16 provided on an outermost circumference of the assembling board 2, a ratchet 30 placed on the bracket 5 in such a manner as will be described hereinafter, and a ball 18 urged towards the retaining wall 16 through a resilient force caused by a spring 17 of compression type. As shown in FIG. 1, the spring 17 is accommodated inside a through bore longitudinally provided for a head block portion 29, while it is interposed between a head side 30a of the ratchet 30 and the ball 18 received by the retaining wall 16 under its resilient condition. The retaining wall 16 is so arranged that it has three valley-like portions 19, 20 and 21. Thus, when the actuator 7 remains in the neutral position N, the ball 18 is urgedly attached to the central valley-like portion 20 as shown in FIG. 1 and therefore, the bracket 5 is left retained in its neutral position $B_N$. Alternately, when the actuator 7 is pivotally moved towards the first position R, the bracket 5 is pivotally moved in a direction by an arrow B, in which the ball 18 is resiliently held by the spring 17 is slidably moved towards the valley-like portion 19 until it is complementarily retained in the valley-like portion 19. Such being the case, as can be seen in FIG. 4, the bracket 5 is to take a position $B_R$ for energizing a right direction indicator blinker light. Similarly, when the actuator 7 is pivotally moved towards the second position L, the bracket 5 is pivotally moved in a direction as denoted by an arrow D, in which the ball 18 is in turn slidably moved towards the valley-like portion 21 until it is complementarily retained in the valley-like portion 21. Such being the case, as can be seen in FIG. 5, the bracket 5 takes a position $B_L$ for energizing a left direction indicator blinker light. In the arrangement of the present invention, the respective tenion springs 10 and 11 are ready to function as self-retaining members against an extraordinary exertion of pressure, such as may be brought about when the bracket 5 is undesirably maintained in a locked condition and therefore, need to be released. For such purposes as stated above, the resilient force caused by the spring 10 or the spring 11 is adapted to be a little larger than that required for the pivotal movement of the bracket 5, while both of the springs 10 and 11 are ordinarily maintained in respective unstretched states in accordance with the pivotal movement of the bracket 5. The numeral 22 designates a direction indicator blinker light switch constituting an electrical circuit for the blinker lights, which comprises a plurality of fixed contacts 23 assembled on the assembling board 2 and a plurality of movable contacts 24 each disposed in position on the bracket 5. When the bracket 5 is pivotally moved and then, is disposed on the position for energizing the right direction indicator blinker light $B_R$, the movable contacts 24 are adapted to be in contact with the appropriate fixed contacts in a predetermined manner such that the right direction indicator blinker light is electrically turned ON. On the other hand, when the bracket 5 is pivotally moved and then, is in position for energizing the left direction indicator blinker light $B_L$, the movable contact 24 are further adapted to be in contact with the appropriate fixed contacts in a predetermined manner such that the left direction indicator blinker light is electrically turned ON. The numeral 25 designates a cancelling mechanism, with which the bracket 5 being retained either in the position $B_R$ for the right direction indicating mode, or in the position $B_L$ for the left direction indicating mode is adapted to be self-returned to the neutral position. The cancelling mechanism 25 includes a cancelling cam member 26, which is adapted to surround the steering shaft 3 in a manner such that it can be rotated with the steering shaft 3 incorporating a cylindrical member 4 of the assembling board 2 and more particularly, with a steering wheel 27. The cancelling cam member 26 is provided with a pair of projected portions 28 formed at diametrically opposite locations on its outermost circular circumference. As can be seen in FIG. 3, bracket 5 is shaped in an approximately pentagonal configuration and has a head block portion 29 provided with the through bore in which the compression coil spring 17 and the ball 18 can be accommodated. Further, an opposite side relative to the side with the bore is inwardly fully receded to provide a wall configuration 29a. A pair of block portions extending angularly from respective lateral sides of the head block portion 29 are adapted to integrally bridge the head block portion 29 and a pair of parallelly facing block portions. The upper surfaces of the angularly extending block portions are stepped down with respect to the upper surfaces of both the head block portion and the parallelly facing block portions. The parallelly facing block portions are provided with a pair of round cornering projections 5c and 5d on both heads of the cancelling mechanism also includes block portions. The ratchet 30 disposed on the angularly extending block portions and is assembled in a manner such that respective lateral extremities 31 and 32 are urged onto the respective round cornering portions 5c and 5d through the resilient force caused by the coil spring 17, with a central portion of ratchet 30 being seized by the wall portion 29a of the block portion 29. Further, relative assembling locations of the ratchet 30 and the other elements of the invention are adapted to provide such moving correlation that either of the extremities 32 and 31 can come within a locus, which is effected through a rotating movement of either of the projected portions 28 in association with the corresponding rotating movement of the bracket 5 between two positions $B_R$ and $B_L$.

By the arrangement as described in the foregoing, the arrangement of the present invention can function as follows. For example, when the actuator 7 is pivotally operated from its neutral position N to its first position R with an intention or making a right turn of the motor vehicle, the steel wire 8 is first pulled in the direction as denoted by the arrow A in FIG. 1. In accordance with such pulling effectuation of the steel wire 8, the bracket 5 is pivotally moved with respect to the pivot center 6, until it is retained in the position $B_R$ for the right direction indicating mode, with the ball 18 being complementarily held in the valley-like portion 19 (see FIG. 4).

As the result of such pivotal movement of the bracket 5 in the direction as denoted by the arrow B, the direction indicator blinker light switch 22 is actuated so as to effect the right direction indicator blinker light. When the steering wheel 27 having been rotated towards the right (clockwise) for making the right turn of the motor vehicle with such switching state is again rotated towards the left (counterclockwise) so as to be returned in the neutral position, the cancelling cam 26 is rotated in association with such rotation of the steering wheel 27, with the cam projection 28 approaching to engage with the extremity 31 of the ratchet 30 from a direction as denoted by an arrow E. After such engagement between the extremity 31 and the projected portion 28 is once effected, the ratchet 30 with the bracket 5 is further pivotally driven, with the bracket 5 being urged towards the arrow D, until the bracket 5 is returned to its neutral position $B_N$. Soon after the bracket 5 is returned to its neutral position $B_N$, the bracket 5 is retained there through the resilient force caused by the ball 18. During such pivotal movement of the bracket 5, the direction indicator blinker switch 22 is also returned to its non-actuating state and thus, the electrical circuit for the right direction indicator blinker light is interrupted. In accordance with the pivotal movement of the bracket 5 in the direction as denoted by the arrow D, the steel wire 8 is being in turn pulled in the direction opposite that denoted by the arrow A, thus making the actuator 7 retained in an urged state in a direction as denoted by an arrow F. Accordingly, when the bracket 5 is to take the neutral position $B_N$, the actuator 7 is simultaneously self-returned to its neutral position N. However, it is to be noted here that, according to the arrangement of the present invention, when the steering wheel 27 is rotated towards the right for making the right turn following the energization of the right direction indicator blinker light, the cancelling cam 26 is also rightwardly rotated. Such being the case, in accordance with the rotation of the cancelling cam 26, the cam projection 28 is also rightwardly rotated and then, drives the extremity 31 of the ratchet 30 in a reverse direction relative to the direction as denoted by the arrow E. However, such drive caused by the movement of the cam projection 28 only causes the escape of the ratchet with respect to the extremity 32 in the direction as denoted by G (see FIG. 4), while the coil spring 17 is further compressed and its resilient force is consequently being increased during such driving engagement. Owing to the arrangement as stated above, not only is the ratchet 30 not spoiled, but also the displacement of the bracket 5 is retained in the position for the right direction indicating mode in the direction as denoted by B can not be brought about.

On the contrary to such operation as described above, when the actuator 7 is pivotally operated from its neutral position N to its second position L with an intention for making a left turn, the steel wire 9 is first pulled in the direction as denoted by the arrow C in FIG. 1. In accordance with such pulling of the steel wire 9, the bracket 5 is pivotally moved with respect to the pivot center 6 in the direction as denoted by the arrow D, until it is retained in the position $B_L$ for the left direction indicating mode, with the ball 18 being complementarily held in the valley-like portion 21 (see FIG. 5). As the result of such pivotal movement of the bracket 5, the direction indicator blinker light switch 22 is actuated so as to effect the left direction indicator blinker light. Similarly, when the steering wheel is successively turned towards left in operation for making the left turn with the energization of the left direction indicator blinker light, the cancelling cam 26 is also leftwardly rotated. Thus, in accordance with such rotation of the cancelling cam 26, the cam projection 28 is also leftwardly rotated and then, is to drive the extremity 32 of the ratchet 30 in the direction as denoted by the arrow E. However, the drive caused by the movement of the cam projection 28 only causes the escaping movement of the ratchet 30 with respect to the extremity 31 in the direction as denoted by the arrow H (see FIG. 5), while the coil spring 17 is further compressed and its resilient force is consequently being increased during such driving engagement. When the steering wheel 27 is again rotated towards the right to let it be returned to its neutral position, the cancelling cam 26 is rotated in association with such rotation of the steering wheel 27, with the cam projection 28 approaching to engage with the extremity 32 of the ratchet 30 from the direction opposite relative to the direction as denoted by the arrow E. After the engagement between the extremity 32 and the projected portion 28 is once effected, the ratchet 30 with the bracket 5 is further pivotally driven in the direction as denoted by the arrow B, until the bracket 5 is returned to its neutral position $B_N$. Soon after the bracket 5 is returned to its neutral position $B_N$, the bracket 5 is retained there through the resilient force caused by the ball 18. Further, during the pivotal movement of the bracket 5, the direction indicator blinker switch 22 is also returned to its non-actuating state and thus, an electrical circuit for the left direction indicator blinker light is interrupted. In accordance with the pivotal movement of the bracket 5 in the direction as denoted by the arrow B, the steel wire 9 is being pulled in the reverse direction relative to the direction as denoted by the arrow C, thus making the actuator 7 be retained in an urged state in the direction as denoted by the arrow I. Accordingly, when the bracket 5 is to take the neutral position $B_N$, the actuator 7 is simultaneously automatically returned to its neutral position N.

Figure 6:
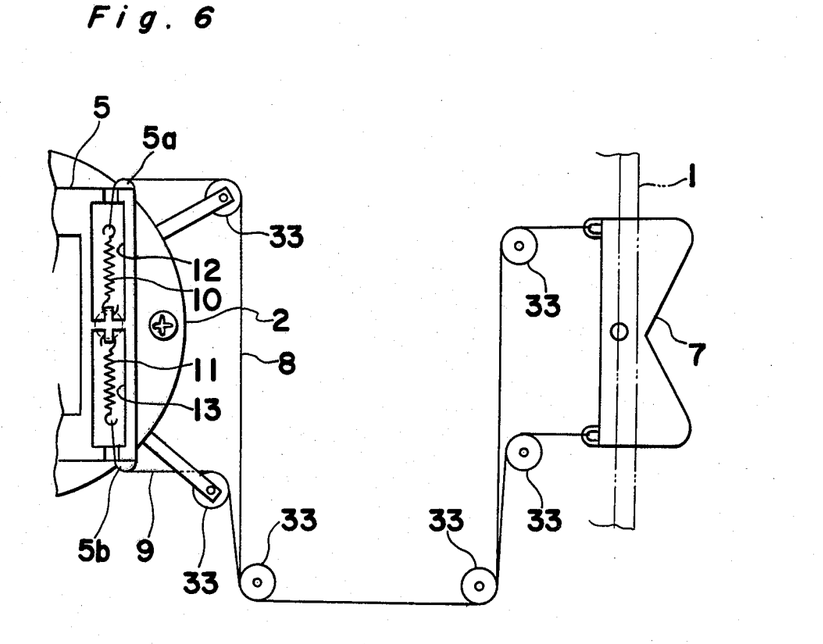
FIG. 6 is a fragmentary top plan view of one modified embodiment of the arrangement shown in FIG. 1.

Referring now to FIG. 6, there is shown one modified embodiment of the arrangement of the present invention, in which there are provided a plurality of pulleys 33 over which the respective steel wires 8 and 9 can run for the purposes as described in connection with the former embodiment. More specifically, some pulleys 33 are provided on the assembling board 22, with the rest being secured to the framework 1. The respective stretching portions of these steel wires 8 and 9 are adapted to be supported with several number of the pulleys 33, so that the steel wires 8 and 9 can be stretched between the respective ring members and coil springs 10 and 11 with appropriate numbers of turns thereof, if these can not be directly stretched between them. Moreover, since the stretching directions of these steel wires 8 and 9 can be changed in any manner, depending on circumstances, it becomes possible for the actuator 7 to be assembled on the dashboard.

Figure 7:
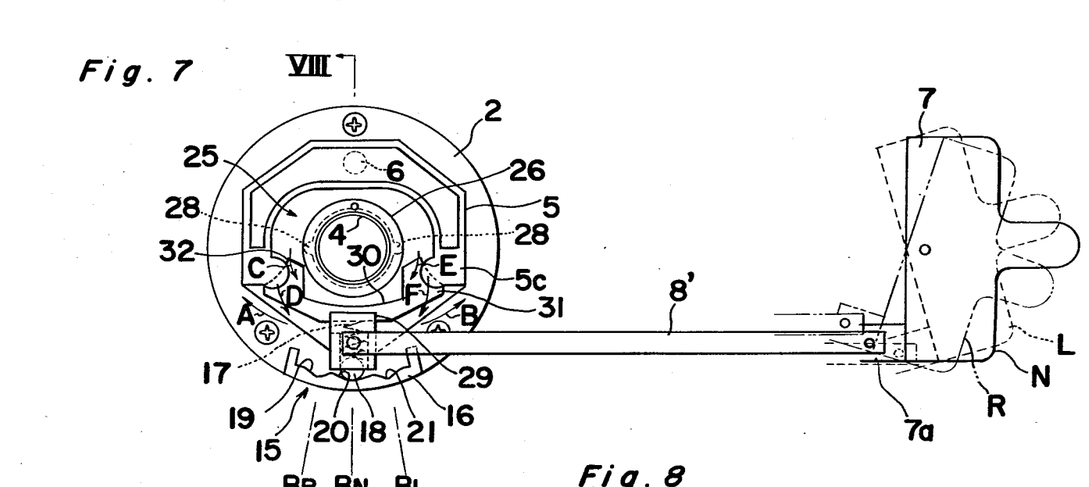
FIG. 7 is a view similar to FIG. 1, particularly showing one further modified embodiment of the arrangement shown in FIG. 1.
Figure 8:
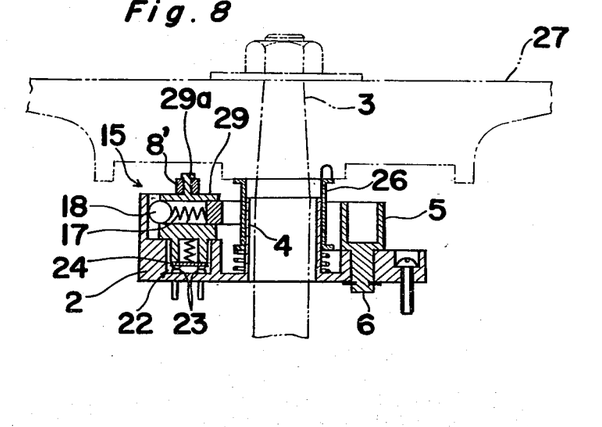
FIG. 8 is a view similar to FIG. 2, particularly showing a cross sectional view of the arrangement shown in FIG. 7, while being taken generally on the plane of line VIII—VIII of FIG. 7.

Referring now to FIGS. 7 and 8, there is shown further modified embodiment of the arrangement of the invention. However, for the sake of brevity, such like parts as included in the embodiment as shown in FIGS. 1 to 5 are not detailed here. This modified arrangement of the present invention also comprises an assembling board 2 secured to a framework (not shown here) mounted on a steering column (not shown here), a multi-laterally shaped bracket 5 positioned on the assembling board 2 and including a ratchet 30, a direction indicator blinker light switch 22, a cancelling mechanism 25, and an actuator 7. Similar to the former embodiment, the actuator 7 of the see-saw type is also mounted to the framework, while being separated from the location of the assembling board 2. According to this embodiment, between the bracket 5 and the actuator 7, a rigid elongated member (connecting rod) 8' as best shown in FIG. 7 is provided, so that these bracket 5 and actuator 7 are capable of being connected and then, can cooperate with each other as will be described hereinbelow. One end of the connecting rod 8' is pivotally connected to a projected portion 7a of the actuator 7, while the projected portion 7a is provided on the edge of a rear surface so that it can be disposed apart from a pivotal center of the actuator 7. On the other hand, the other end of the connecting rod 8' is pivotally connected to a projection 29a provided for a head block portion 29 of the bracket 5. The functional characteristics of this modified embodiment is not so much different from the former embodiment, except that the bracket 5 is pivotally driven by means of the connecting rod 8' which move in a substantially longitudinal direction in response to the pivotal movement of the actuator 7.

Figure 9:
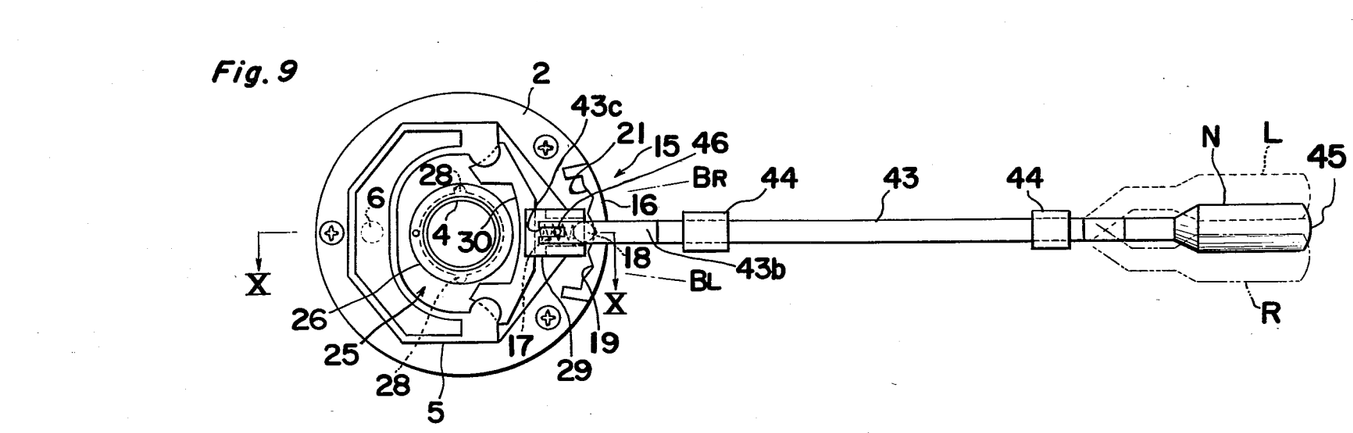
FIG. 9 is a view similar to FIG. 1, particularly showing one still further modified embodiment of the arrangement shown in FIG. 1.
Figure 10:
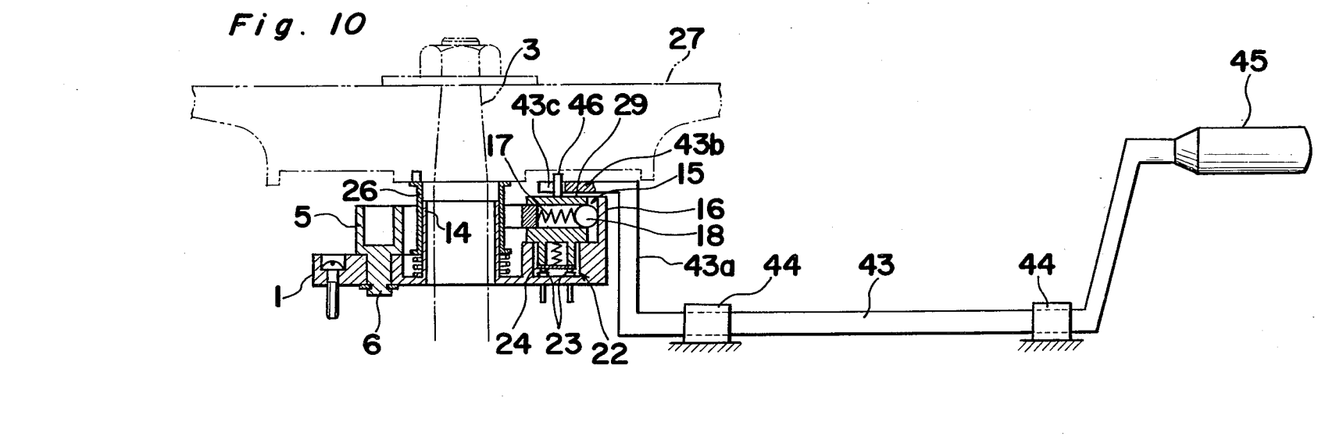
FIG. 10 is a side view of the arrangement shown in FIG. 9, while being taken generally on the plane of line X—X of FIG. 9 to show a partial, cross sectional view of the arrangement.

FIGS. 9 and 10 illustrate a further modified embodiment of the present invention. This embodiment is also adapted to be actuated with a connecting rod 43. However, according to the embodiment shown in FIGS. 7 and 8, an elongated rigid member (crank) in the form of connecting rod 8' is connected to the head block portion 29 in a manner such that a longitudinal axis of the rod 8' is intersected with a longitudinal axis at substantial right angles, when the bracket 5 is maintained in the neutral state. On the contrary, the connecting rod 43 is connected to a head block portion 29 in a manner such that a longitudinal axis of a leading portion 43b of the connecting rod 43 substantially coincides with the longitudinal axis of the head block portion 29. Further, as best shown in FIG. 10, the connecting rod 43 is formed to have such configuration of reversely shaped crank shaft with a handle 45 at its one end, while stretching portion of the connecting rod 43 is pivotally supported at two positions with supporting members 44 and 44 secured to the framework (not shown here) so that the rod 43 is movable only about an axis extending along its elongated portion. The handle 45 is spacedly disposed in a manner such that it can be readily actuated with the drive of the steering wheel 27. Consequent positions of the handle 45 pivotally actuated are denoted in respective fantom lines L and R in FIG. 9, while the neutral position of the handle 45 is denoted in a full line. A portion 43a stretched directionally oppositely relative to the handle 45 is formed to render an L-shaped arm whose leading portion 43b extends towards the bracket 5 in an approximately parallel relationship with the extending direction of the handle 45. Further, the leading portion 43b is provided with a slit 43c with which a projection 46 provided for the bracket 5H is coupled. By the arrangement, the handle 45 as the actuator and the bracket 5 is pivotally interconnected with the such rod 43 having L-shaped configuration, in which in accordance with the pivotal movement of the handle 45, the bracket 5 is subjected to be retained either in the position $B_R$ for the right direction indicating mode or in the position $B_L$ for the left direction indicating mode. Similar to all the embodiments as described earlier, the handle 45 is also automatically returned to its neutral position N in response to the pivotal movement of the bracket 5, which is brought about as the actuation of the function of the cancelling mechanism. Although both of the embodiment shown in FIG. 7 and that shown in FIG. 9 respectively introduce rods as for the member for conducting the drive effected by the actuator, such a flexible cable having therein a drive transmitting wire can be available. For example, some types of the flexible cables capable of transmitting forward drive as well as backward drive (marketed by Nippon Cable System Inc., Japan) may be preferable. However, such being the case, the flexible cable for the purposes is adapted to run on such pulleys and the like as described in the embodiment shown in FIG. 6.

As is clear from the description in the foregoing, according to the invention, the means adapted to function as the actuator of the means for actuating direction indicator blinker light and the operating means adapted to function as the cancelling mechanism are separately provided, and these are interconnected with the means for transmitting the drive caused by the actuator. Accordingly, the assembling positioning of the means adapted to function as the actuation is not subjected to the mounting positioning of the means adapted to function as the cancelling mechanism at all. Further, due to such advantages as described above, the means adapted to function as the cancelling mechanism can be constructed in a compact size, with results such that the ornamental features surrounding the dashboard and the steering wheel can be much improved.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A direction indicator blinker light switching arrangement for use in a motor vehicle having a steering shaft and first and second blinker light terminals respectively alternatively engageable to turn on first and second blinker lights, comprising:
   an actuator, pivotally mounted to said vehicle, located within reach of a driver of said vehicle and selectively movable between a first neutral position and a first actuating position and between said first neutral position and a second actuating position directionally opposite said first actuating position;
   a turn signal switch for engaging said first blinker light terminal to generate a first turn signal when said actuator is in said first actuating position, and for engaging said second blinker light terminal to generate a second turn signal when said actuator is in said second position; and
   means for cancelling a selected positioning of said actuator in said first and second positions, said cancelling means including (1) a cancelling mechanism including:
   (a) a ratchet pivotally movable in a first direction between a second neutral position and a first switching position and in a second direction between said second neutral position and a second switching position directionally opposite said first switching position; and
   (b) a cancelling cam adjacent to said steering shaft, and rotatable in said first and second directions in response to rotation of said steering shaft, said cancelling cam being engageable with said ratchet to move said ratchet respectively from said first and second switching positions to said neutral position when said ratchet is rotated in said second and first directions, respectively, said actuator being spaced from said cancelling mechanism; and
   (2) interconnection means, connecting to said actuator and coupleable with said cancelling mechanism, for transmitting drive forces to move said ratchet from said second neutral position to said first and second switching positions in response to movement of said actuator from said first neutral position to said first and second actuating positions, respectively, and to move said actuator from said first and second actuation positions to said first neutral position in response to movement of said ratchet respectively from said first and second switching positions to said second neutral position.

2. A direction indicator blinker light switching arrangement for use in a motor vehicle having a steering shaft and first and second blinker light terminals respectively alternatively engageable to turn on first and second blinker lights, comprising:
   an actuator adapted for pivotal mounting to said vehicle within reach of a driver of said vehicle, selectively pivotally movable in opposite directions from a first neutral position to first and second actuating positions;
   means for cancelling a selected positioning of said actuator in said first and second positions, said cancelling means including (1) a cancelling mechanism, said cancelling mechanism including:
   (a) a ratchet pivotally movable in a first direction between a second neutral position and a first switching position and in a second direction between said second neutral position and a second switching position directionally opposite said first switching position; and
   (b) a cancelling cam adjacent to said steering shaft and rotatable in said first and second directions in response to rotation of said steering shaft, said cancelling cam being engageable with said ratchet to move said ratchet respectively from said first and second switching positions to said second neutral position when said ratchet is rotated in said second and first directions, respectively; and
   (2) interconnection means, coupling said actuator and said cancelling mechanism, for transmitting drive forces to move said ratchet from said second neutral position to said first and second switching positions in response to movement of said actuator from said first neutral position to said first and second actuating positions, respectively, and to move said actuator from said first and second actuation positions to said first neutral position in response to movement of said ratchet respectively from said first and second switching positions to said second neutral position, said interconnection means including a bracket pivotally mounted to said vehicle about said steering shaft and engageable with opposite ends of said ratchet, and means, coupling said actuator and said bracket, for transmitting pivotal drive forces between said actuator and said bracket when one of said actuator and said bracket are pivoted; and
   turn signal switching means, fixed to said bracket, for contacting said blinker lights, to turn on said first and second blinker lights when said actuator is in said first and second actuating positions, respectively, said actuator being pivotally mounted to said vehicle at a location spaced from said bracket.

3. A direction indicator blinker light switching arrangement as in claim 1 or claim 2, wherein said interconnecting means includes a rigid elongated member.

4. A direction indicator blinker light switching arrangement as in claim 1 or claim 2, wherein said interconnecting means comprises at least one flexible cable capable of transmitting forward and backward drive forces.

5. A direction indicator blinker light switching arrangement as in claim 1 or claim 2, wherein said interconnecting means comprises a pair of flexible elongated elements.

6. An arrangement as in claim 1, wherein said interconnecting means comprises a pair of flexible elongated elements, coupled to opposite ends of said actuator and coupleable with opposite ends of said ratchet such that when one of said actuator and said ratchet is moved in a first pivotal direction, a first drive force is transmitted through one of said elongated flexible elements and when one of said actuator and said ratchet is moved in a second pivotal direction opposite said first pivotal direction, a second drive force oppositely directed to said first drive force is transmitted through the other of said elongated flexible elements.

7. An arrangement as in claim 1, wherein said interconnecting means further comprises a pair of flexible elongated elements having first and second ends, said first ends being connected to opposite ends of said actuator, and a bracket pivotally mounted for pivotal movement about an axis of rotation, surrounding said steering shaft, said pair of elongated elements being spring mounted to said bracket at said second ends, said cancelling cam being engageable with said ratchet to pivot said ratchet and said bracket.

8. An arrangement as in claim 1, wherein said interconnecting means includes a bracket pivotally mounted to said vehicle and surrounding said steering shaft, said interconnecting means further comprising a rigid elongated member pivotally mounted to said actuator and to said bracket.

9. An arrangement as in claim 1, wherein said interconnecting means includes a crank shaft connected to said actuator.

10. An arrangement as in claim 1, wherein said interconnecting means includes a pivotable bracket surrounding said steering shaft and an elongated member having a longitudinal axis extending between and mounted to said actuator and said bracket, said elongated member being movable principally along a line along said longitudinal axis extending between said actuator and said bracket.

11. An arrangement as in claim 1, wherein said interconnecting means includes a pivotable bracket surrounding said steering shaft and an elongated member having a longitudinal axis extending generally between said bracket and said actuator, said elongated member being movable only about said longitudinal axis.

12. An arrangement as in claim 2, wherein said interconnecting means comprises a pair of flexible elongated elements coupled to opposite ends of said actuator and being spring mounted to said bracket at respective ends of said pair of elongated flexible elements, said cancelling cam being engageable with said ratchet to pivot said ratchet and said bracket.

13. An arrangement as in claim 12, wherein said interconnecting means further comprises a plurality of pulley-like members, said pair of flexible elongated elements running on said plurality of pulley-like members to change the direction of movement of each of said pair of flexible elongated elements between said actuator and said bracket.

14. An arrangement as in claim 2, wherein said interconnecting means further comprising a crank shaft connected at opposite ends to said actuator and said bracket.

15. An arrangement as in claim 2, wherein said interconnecting means includes an elongated member having a longitudinal axis extending between and mounted to said actuator and said bracket, said elongated member being movable principally along a line along said longitudinal axis extending between said actuator and said bracket.

16. An arrangement as in claim 2, wherein said interconnecting means includes an elongated member having a longitudinal axis extending generally between said bracket and said actuator, said elongated member being movable only about said longitudinal axis.

17. A direction indicator blinker light switching arrangement for use in a motor vehicle having a steering shaft and first and second blinker light terminals respectively alternatively engageable to turn on first and second blinker lights, comprising:
- an actuator, pivotally mounted to said vehicle, located within reach of a driver of said vehicle and selectively movable between a first neutral position and a first actuating position and between said first neutral position and a second actuating position directionally opposite said first actuating position;
- a turn signal switch for enggaging said first blinker light terminal to generate a first turn signal when said actuator is in said first actuating position, and for engaging said second blinker light terminal to generate a second turn signal when said actuator is in said second position; and
- means for cancelling a selected positioning of said actuator in said first and second positions, said cancelling means including (1) a cancelling mechanism including:
  - (a) a ratchet pivotally movable in a first direction between a second neutral position and a first switching position and in a second direction between said second neutral position zand a second switching position directionally opposite said first switching position; and
  - (b) a cancelling cam adjacent to said steering shaft, and rotatable in said first and second directions in response to rotation of said steering shaft, said cancelling cam being engageable with said ratchet to move said ratchet respectively from said first and second switching positions to said second neutral position when said ratchet is rotated in said second and first directions, respectively, said actuator being spaced from said cancelling mechanism; and
  - (2) interconnection means, connecting to said actuator and coupleable with said coupling mechanism, for transmitting drive forces to move said ratchet from said second neutral position to said first and second switching positions in response to movement of said actuator from said first neutral position to said first and second actuating positions, respectively, and to move said actuator from said first and second actuation positions to said first neutral position in response to movement of said ratchet respectively from said first and second switching positions to said second neutral position, said interconnecting means including at least one flexible elongated element coupled to said actuator and said cancelling mechanism for transmitting said drive forces between said ratchet and said actuator and a plurality of pulley-like members, said at least one flexible element running on said plurality of pulley-like members to change the direction of movement of each of said at least one flexible elongated elements between said actuator and said cancelling mechanism.

18. An arrangement as in claim 17, wherein said at least one flexible elongated element includes a pair of flexible elongated elements coupled to opposite ends of said actuator and coupleable to opposite ends of said ratchet for transmitting said drive forces between said ratchet and said actuator.

19. An arrangement as in claim 17, wherein said at least one elongated flexible element comprises a cable capable of transmitting forward and reverse drive forces.

* * * * *